United States Patent [19]  
Nakamura

[11] Patent Number: 5,059,667  
[45] Date of Patent: Oct. 22, 1991

[54] STYRENE-BASED POLYMER AND METHOD FOR THE PREPARATION THEREOF

[75] Inventor: Shinichi Nakamura, Sodegaura, Japan

[73] Assignee: Idemitsu Petrochemical Company, Ltd., Tokyo, Japan

[21] Appl. No.: 460,264

[22] Filed: Jan. 2, 1990

[30] Foreign Application Priority Data

Jan. 9, 1989 [JP] Japan .................................. 1-2267

[51] Int. Cl.$^5$ ...................... C08F 222/10; C08F 12/36
[52] U.S. Cl. .................................. 526/324; 526/336; 526/347
[58] Field of Search ................. 526/347, 324, 336

[56]  References Cited

U.S. PATENT DOCUMENTS 2,665,270  12/1950  Howard et al. ............... 526/347
3,231,544   1/1966  Cotman, Jr. et al. .......... 526/347
4,228,269  10/1980  Loshack et al. .............. 526/347

FOREIGN PATENT DOCUMENTS 0028394  5/1981  European Pat. Off. .......... 526/347
 764465  12/1956  United Kingdom ............. 526/347
2042565   9/1980  United Kingdom ............. 526/347

Primary Examiner—Joseph L. Schofer  
Assistant Examiner—N. Sarofim  
Attorney, Agent, or Firm—Wyatt, Gerber, Burke and Badie

[57]  ABSTRACT

The styrene-based polymer of the invention, which is excellent in the impact strength, rigidity and heat resistance as well as high-speed moldability, is characterized by a specified weight-average molecular weight and a specified relatively low content of a moiety derived from a polyfunctional vinyl compound, e.g., divinyl benzene. The polymer is also characterized by the behavior of kinematic viscosity. Such a styrene-based polymer can be prepared by the radical polymerization reaction of styrene monomer with admixture of a limited amounts of a polyfunctional vinyl compound and a polymerization initiator.

4 Claims, 1 Drawing Sheet

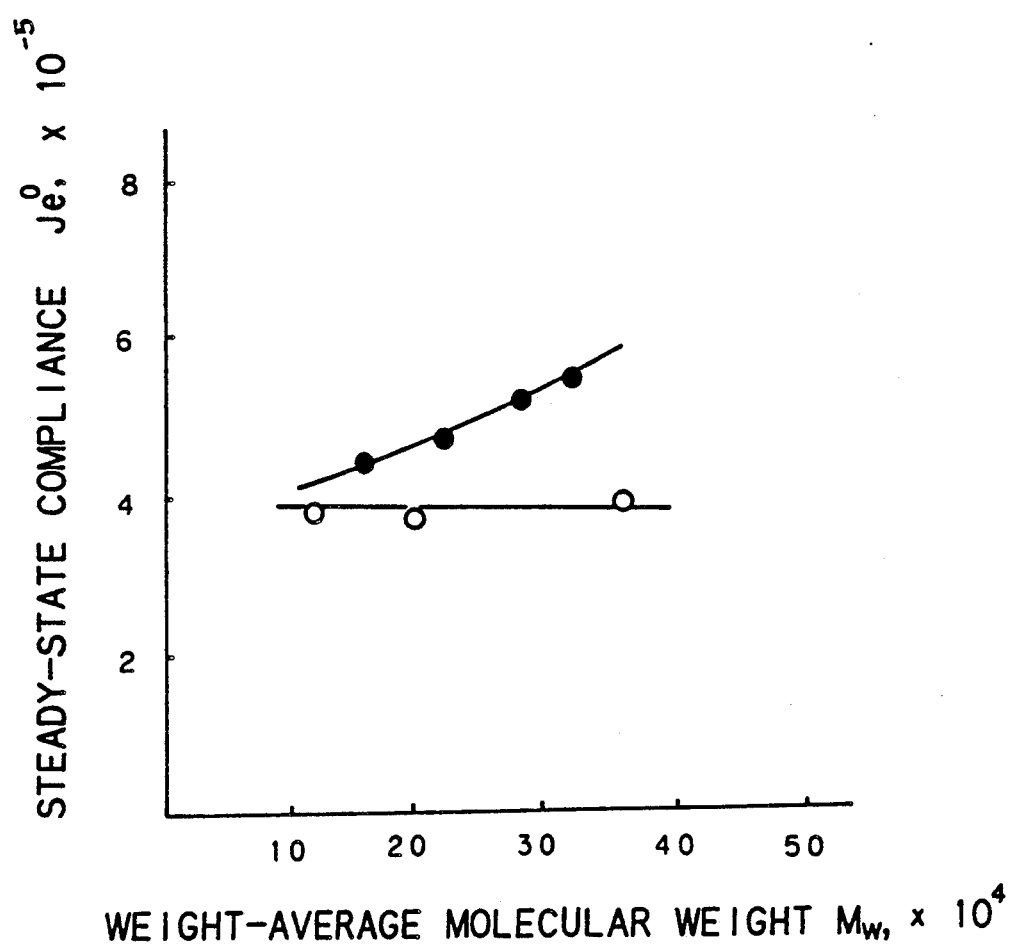
FIGURE

STYRENE-BASED POLYMER AND METHOD FOR THE PREPARATION THEREOF

BACKGROUND OF THE INVENTION

The present invention relates to a novel styrene-based polymer and a method for the preparation thereof. More particularly, the invention relates to a novel styrene-based polymer of a branched-chain molecular structure obtained by the copolymerization of an aromatic monovinyl compound and a polyfunctional vinyl compound and having, in addition to the excellent impact strength, rigidity and heat resistance, excellent moldability or, in particular, moldability by high-speed injection molding so as to be useful as a molding material of various kinds of household commodities and parts of electric and electronic appliances.

By virtue of the excellent transparency and moldability as well as good electrical and mechanical properties, styrene based polymers are widely used hitherto as a molding material of various kinds of household commodities and parts of electric and electronic appliances. It is a trend in recent years that styrene-based polymers having upgraded properties are required so as to exhibit a good balance between mechanical properties such as impact strength and rigidity and other properties such as heat resistance along with excellent moldability.

It is generally understood that mechanical strengths or, in particular, impact resistance of a styrene-based polymer can be improved when the polymer has an increased average molecular weight. A problem in this way is that the moldability of a styrene based polymer is unavoidably decreased when the polymer has an excessively large molecular weight. Although the moldability of a styrene-based polymer can be improved by compounding the polymer with a plasticizer such as a mineral oil, a plasticized styrene-based polymer has another problem of an unavoidable decrease in the rigidity and heat resistance.

Accordingly, several attempts and proposals have been made in order to simultaneously improve the properties such as mechanical strengths, heat resistance and moldability of a styrene-based polymer including a method in which the fraction of low molecular-weight molecules in the polymer is increased by controlling the polymerization reaction as is disclosed in Japanese Patent Publication 57-30843, a method in which the polymer contains an extremely small amount of ultra-high molecular-weight molecules as is disclosed in Japanese Patent Publication 62-61231 and so on. The former method, however, has a disadvantage that the impact strength of the articles shaped from such a polymer is greatly decreased as the fraction of the low molecular-weight molecules is increased. The latter method is not always applicable to an industrial process because the method involves complicated steps including the preparation of an ultra-high molecular-weight styrene based polymer by the polymerization under conditions different from those in the preparation of the major portion of the styrene-based polymer and blending of a very small amount of the ultra-high molecular-weight polymer with a major amount of the polymer having an ordinary molecular weight. In addition, the improvement in the impact strength is still insufficient in the styrene-based polymer obtained by such a blending method.

Alternatively, a method has been proposed for the simultaneous improvement in the impact strength and mold-ability of a styrene-based polymer by the copolymerization of an aromatic monovinyl compound, e.g., styrene, and a polyfunctional vinyl compound so as to give a copolymer having a broad molecular weight distribution. This method, however, is not free from the problem that, due to the microscopic distribution of crosslinked or gelled molecules, the polymer is not satisfactory in respect of the rigidity, high-speed moldability and heat resistance.

Thus, no method is hitherto known to provide a styrene-based polymer having a good balance among the properties such as impact strength, rigidity, heat resistance and the like along with excellent moldability suitable for high-speed injection molding.

SUMMARY OF THE INVENTION

The present invention accordingly has an object to provide a novel styrene-based polymer having, in addition to the excellent impact strength, rigidity and heat resistance, excellent moldability suitable, in particular, for high-speed injection molding so as to be quite satisfactory as a molding material of various kinds of household commodities and parts of electric and electronic appliances as well as to provide a method for the preparation of such a novel styrene-based polymer.

Thus, the styrene-based polymer of the present invention is a copolymer of an aromatic monovinyl compound and a polyfunctional vinyl compound, in which the weight proportion of the moiety derived from the polyfunctional vinyl compound is in the range from 30 to 300 ppm based on the moiety derived from the aromatic monovinyl compound, having a weight-average molecular weight in the range from 150,000 to 350,000, of which the ratio of the kinematic viscosities $\Delta\eta'(\eta'_a/\eta'_b)$ does not exceed 0.07 where $\eta'_a$ and $\eta'_b$ are the kinematic viscosities when the shear rate in a cone-and-disc type rheometer is $1\times 10^2$ rad/second and $1\times 10^{-2}$ rad/second, respectively.

The above defined specific styrene-based polymer is prepared by the polymerization of the aromatic monovinyl compound with admixture of from 35 to 350 ppm by weight of the polyfunctional vinyl compound and from 10 to 500 ppm by weight of a polymerization initiator.

BRIEF DESCRIPTION OF THE DRAWING

The FIGURE is a graphic showing of the steady-state compliance of the inventive styrene-based polymer and a general-purpose polystyrene as a function of the weight-average molecular weight.

DETAILED DESCRIPTION OF THE PREFERRED EMBODIMENTS

As is described above, the inventive styrene-based polymer is characterized by the specified content of the moiety derived from a polyfunctional vinyl compound in the moiety derived from. an aromatic monovinyl compound and a specified weight-average molecular weight as well as by the specific characteristics of the kinematic viscosity.

The aromatic monovinyl compound, which is the principal starting material for the preparation of the inventive styrene-based polymer, is exemplified by styrene; α-substituted alkyl styrenes such as α-methyl styrene, α-isopropyl styrene and the like; nucleus-substituted alkyl styrenes such as 4-methyl styrene, 3-methyl styrene, 2,5-dimethyl styrene and the like and nucleus-substituted halogenated styrenes such as 4- chlorostyrene, 4-bromostyrene and the like as well as vinyl toluene and the like. These aromatic monovinyl compounds can be used either singly or as a combination of two kinds or more according to need.

The polyfunctional vinyl compound to be copolymerized with the above described aromatic monovinyl compound is exemplified by non-conjugated divinyl compounds such as divinyl benzene and the like and polyacrylate compounds including diacrylate compounds such as polyethylene glycol diacrylate, 1,3-butylene glycol diacrylate, 1,6-hexene glycol diacrylate, 2,2-dimethyl pentene glycol diacrylate, polyoxypropylene glycol diacrylate, 2,2-bis(4-acryloxypropoxyphenyl) propane, 2,2-bis(4-acryloxy diethoxy phenyl) propane and the like, dimethacrylate compounds such as ethylene glycol dimethacrylate, diethylene glycol dimethacrylate, triethylene glycol dimethacrylate, polyoxyethylene glycol dimethacrylate, 1,3-butylene glycol dimethacrylate, 1,4-butylene glycol dimethacrylate, 1,6-hexene glycol dimethacrylate, 2,2-dimethylpentene glycol dimethacrylate, dipropylene glycol dimethacrylate, polyoxypropylene glycol dimethacrylate, 2,2-bis(4-methacryloxy diethoxy phenyl) propane and the like, triacrylate compounds such as trimethylol propane triacrylate, trimethylol ethane triacrylate, tetramethylol propane triacrylate and the like, trimethacrylate compounds such as trimethylol propane trimethacrylate, trimethylol ethane trimethacrylate and the like, tetraacrylate compounds such as tetramethylol methane tetraacrylate and the like, tetramethacrylate compounds such as tetramethylol methane tetramethacrylate and the like, and so on. These polyfunctional vinyl compounds can be used either singly or as a combination of two kinds or more according to need.

It is essential that the styrene based polymer of the invention is substantially free from a gelled fraction so that the amount of the polyfunctional vinyl compound added to the polymerization mixture of the aromatic monovinyl compound should be small enough not to form a substantial amount of a gelled matter. In particular, the amount of the polyfunctional vinyl compound added to the aromatic monovinyl compound should be in the range from 35 to 350 ppm by weight or, preferably, from 50 to 250 ppm by weight based on the aromatic monovinyl compound so that the content of the moiety derived from this monomer in the resultant copolymer can be in the range from 30 to 300 ppm by weight. When the added amount thereof is too small, the desired effect to be exhibited by the addition thereof can hardly be exhibited while, when the added amount thereof is too large, a too large number of crosslinks are formed in the polymer so that the polymer would eventually be insoluble and infusible with a developed network structure containing a significant amount of a gelled matter and the polymer can no longer be molded under ordinary molding conditions. The criterion for the substantial absence of any gelled matter implied here is given by the test that a 6% by weight solution of the polymer in methyl ethyl ketone is clear at room temperature without noticeable cloudiness.

It is optional according to need that a third monomeric compound copolymerizable with the aromatic monovinyl compound and the polyfunctional vinyl compound is added to the polymerization mixture in a limited amount. Examples of such a third monomeric compound include acrylonitrile, methacrylonitrile, methacrylic acid, methyl methacrylate, acrylic acid, methyl acrylate, maleic anhydride, maleimide compounds, nucleus-substituted phenyl maleimide compounds and the like. It is of course optional that two kinds or more of these monomers are used in combination, if desired.

The styrene-based polymer of the present invention should have a weight-average molecular weight in the range from 150,000 to 350,000 or, preferably, from 180,000 to 30,000. When the weight-average molecular weight of the polymer is too small, shaped articles of the polymer may have a greatly decreased impact strength. When the weight-average molecular weight of the polymer is too large, on the other hand, difficulties are encountered in the molding process of the polymer due to the extremely high viscosity of the molten polymer.

Another important parameter to define the inventive styrene-based polymer is the characteristic relative to the kinematic viscosity thereof. Namely, the ratio of the kinematic viscosities $\Delta\eta'(\eta'_a/\eta'_b)$ should not exceed 0.07 or, preferably, should not exceed 0.06 where $\eta'_a$ and $\eta'_b$ are each the kinematic viscosity at a temperature of 200° to 260° C. when the shear rate in a cone-and-disc type rheometer is $1\times10^2$ rad/second and $1\times10^{-2}$ rad/second, respectively. When the value of this ratio is too large, the kinematic viscosity has a decreased frequency dependence and the polymer has an increased melt viscosity in the injection molding with poor moldability.

The method of polymerization for the preparation of the inventive styrene-based polymer is not particularly limitative and any polymerization method conventionally undertaken for the preparation of styrene-based polymers is applicable thereto including the methods of emulsion polymerization, bulk polymerization, solution polymerization, suspension polymerization and the like without particular limitations. The polymerization temperature is also conventional and can be selected in the range, for example, 60° to 200° C. or, preferably, from 80° to 180° C. It is essential that the polymerization reaction is effected in the presence of a radical polymerization initiator. Examples of suitable polymerization initiators include organic peroxide compounds such as tert-butyl hydroperoxide, di-tert-butyl peroxide, cumene hydroperoxide, dicumyl peroxide, benzoyl peroxide, 1,1-bis(tert-butylperoxy) cyclohexane, 1,1-bis(tert-butylperoxy)-3,3,5-trimethyl cyclohexane, 2,2-bis(4,4-di-tertbutylperoxy cyclohexyl) propane and the like and azo compounds such as azobisisobutyronitrile, azobis-2,4-dimethyl valeronitrile, azobiscyclohexane carbonitrile, methyl azobisisobutyrate, azobiscyanovaleric acid and the like though not particularly limited thereto.

The amount of the polymerization initiator added to the polymerization mixture is usually in the range from 10 to 500 ppm by weight or, preferably, from 20 to 450 ppm by weight based on the amount of the aromatic monovinyl compound. When the amount of the polymerization initiator is too small, the polymerization reaction cannot proceed smoothly. When the amount of the polymerization initiator is too large, on the other hand, a highly crosslinked gelled matter having a network structure is formed in the polymer so that the polymer product is insoluble and infusible and difficulties are encountered in the molding process of the polymer.

In carrying out the polymerization reaction, the polyfunctional vinyl compound and the polymerization initiator can be introduced into the polymerization mixture in several different ways. For example, firstly, they can be introduced together with the aromatic monovinyl compound into the polymerization mixture at one time or in several portions. Secondly, they can be introduced together with the aromatic monovinyl compound into the polymerization mixture at one time or portionwise concurrently under continuous introduction thereof. Thirdly, they are introduced into the polymerization mixture continuously together with the aromatic monovinyl compound. Fourthly, they are introduced into the polymerization mixture at a moment when the conversion of the aromatic monovinyl compound has reached 20% to 90%.

It is optional according to need that a molecular weight-controlling agent or a chain transfer agent is added to the polymerization mixture at an appropriate moment. Examples of suitable chain transfer agents include dimer of α-methyl styrene, n-dodecyl mercaptan, tert-dodecyl mercaptan, 1-phenylbutene-2-fluorene, dipentene, chloroform and the like.

It is further optional, if desired, that the polymerization of the aromatic monovinyl compound and the polyfunctional vinyl compound is carried out with admixture of a rubbery polymer in such an amount that the content of the rubbery polymer in the resultant styrene-based polymer is about 3 to 10% by weight. Examples of such a rubbery polymer include polybutadiene, i.e. homopolymer of 1,3-butadiene, rubbery copolymers of 1,3-butadiene with a copolymerizable monomer such as styrene, dimethyl styrene, acrylonitrile, methacrylonitrile, alkyl acrylates, alkyl methacrylates and the like, homopolymers and copolymers of isoprene, poly(butyl acrylate), so-called EPDM rubbers, i.e. copolymers of ethylene, propylene and a diene monomer, and the like.

The styrene-based polymer of the invention obtained in the above described manner contains from 30 to 300 ppm by weight of the moiety derived from the polyfunctional vinyl compound based on the moiety derived from the aromatic monovinyl compound and, as a consequence of the copolymerization with the polyfunctional vinyl compound, the polymer has a branched molecular structure as is evidenced by the graph shown in the FIGURE of the accompanying drawing indicating that the steady-state compliance of the polymer varies depending on the weight-average molecular weight in contrast to conventional general-purpose polystyrenes. In the FIGURE, the curve plotted with filled circles shows the steady-state compliance of the inventive styrene-based polymer obtained by using divinyl benzene as the polyfunctional vinyl compound as a function of the weight-average molecular weight while the curve plotted with open circles indicates that the steady-state compliance of a conventional polystyrene having a linear molecular structure is almost independent on the weight-average molecular weight.

The steady-state compliance $J_e^0$ implied above can be obtained from the following equation according to the method for the determination of the ratio of kinematic viscosities:

$$J_e^0 = \lim_{\omega \to 0}\left(\frac{AG}{\eta_0^2}\right),$$

in which AG is the elastic constant given by $$AG = \lim_{\omega \to 0}\left(\frac{G^I}{\omega^2}\right);$$

and $\eta_0$ is the zero shear rate given by $$\eta_0 = \lim_{\omega \to 0}\left(\frac{G^{II}}{\omega}\right);$$

$G^I$ being the storage modulus when $\omega = 10^{-2}$ rad/second and $G^{II}$ being the loss modulus when $\omega = 10^{-2}$ rad/second.

It is optional in the molding process of the inventive styrene-based polymer that the inventive polymer is compounded, if desired, with various kinds of additives conventionally admixed with styrene-based polymers including lubricants, antioxidants, plasticizers, photostabilizers, flame retardants, coloring agents and the like. Examples of the lubricant include stearic acid, behenic acid, stearoamide, methylene bisstearoamide, ethylene bisstearoamide and the like. Examples of the antioxidant include 2,6-di-tert-butyl-4-methyl phenol, stearyl-β-(3,5-di-tert-butyl-4-hydroxy phenyl) propionate, triethylene glycol-bis-3-(3-tert-butyl-4-hydroxy-5-methyl phenyl) propionate and other hindered phenol compounds and tri(2,4-di-tert-butyl phenyl) phosphite, 4,4'-butylidene bis(3-methyl-6-tert-butyl phenyl-di-tridecyl) phosphite and other phosphite compounds. Examples of the plasticizer include mineral oils, polyoxyethylene glycols and the like.

In the following, examples are given to illustrate the present invention in more detail but not to limit the scope of the invention in any way. In the following examples and comparative examples, the physical parameters of the polymer were determined in the manner described below.

1. Weight-average molecular weight $M_w$

Determination was made by using a gel permeation chromatograph Model 150-C manufactured by Waters Co.

2. Melt index MI, g/10 minutes

Determination was made according to JIS K 7210.

3. Thermal deformation temperature, °C.

Determination was made according to JIS K 7207.

4. Flatwise strength, kg·cm/cm²

Determination of the impact strength was made using an Izod piece in the flatwise direction according to JIS K 7210.

5. Izod impact strength, kg·cm/cm²

Determination was made according to JIS K 7110.

6. High-speed moldability

Inversely truncated conical cup-like forms of the polymer each having a diameter of 45 mm at the bottom, height of 55 mm and wall thickness of 0.5 mm were shaped by high-speed molding at a molding temperature of 280° C. in a cycle time of 6 seconds and records were made of the number of shots by which the continuous molding could be performed. Namely, the index of the moldability was given by the number of shots by which the continuous molding of the cup-like forms could be run without interruption due to troubles such as breaking in the runner of the molded article, clogging in the gate, crack formation in demounting from the mold and the like.

7. Average diameter of dispersed rubber particles

A photomicrograph of 10 000 magnifications of an ultra-thin section of the resin composition was taken on a transmission-type electron microscope and the particle diameters were measured of 800 to 2000 dispersed particles appearing in the photomicrograph, from which the average particle diameter $D_s$ in μm was calculated according to the following equation:

$$D_s, \mu m = \Sigma n_i D_i^3 / \Sigma n_i D_i^2,$$

in which $D_i$ is the diameter of a rubber particle in μm given by the equation $$D_i, \mu m = \sqrt{a \times b},$$

a and b being the diameter in pm of the image of the particle appearing in the photomicrograph along the major axis and minor axis, respectively, and $n_i$ is the number of the particles having a particle diameter of $D_i$.

EXAMPLE 1

Into a first polymerization reactor of 20 liter capacity kept at a temperature of 118° C. was continuously introduced styrene monomer admixed with 80 ppm by weight of 1,1-bis(tert-butylperoxy)-3,3,5-trimethyl cyclohexane as a polymerization initiator, 100 ppm by weight of divinyl benzene and 700 ppm by weight of an antioxidant (Irganox 1076, a product by Ciba Geigy Co.) at a rate of 6 liters per hour to effect copolymerization of styrene and divinyl benzene.

The polymerization mixture coming out of the first polymerization reactor was introduced successively into a second polymerization reactor of 12 liter capacity and then into a third polymerization reactor of 10 liter capacity where the polymerization reaction was continued to completion at a temperature of 110° C. to 180° C. followed by removal of the volatile matter in a vented extruder machine to give a styrene-based copolymer in the form of pellets. No unreacted divinyl benzene could be detected in the pellets. The solid content in the polymerization mixture after completion of the polymerization reaction but before removal of the volatile matter was 94% by weight.

The volatile matter recovered contained 80 ppm by weight of divinyl benzene based on the styrene monomer so that the content of the divinyl benzene moiety in the pelletized polymer should be 95 ppm by weight by calculation.

Table 1 below shows the results of the measurements of several parameters obtained with this polymer.

EXAMPLE 2

The same experimental procedure as in Example 1 was repeated except that the amount of divinyl benzene added to the starting monomer mixture was decreased from 100 to 70 ppm by weight. The content of the divinyl benzene moiety in the resultant polymer was calculated as 66 ppm by weight.

Table 1 also shows the results of the measurements of several parameters obtained with this polymer.

EXAMPLE 3

The same experimental procedure as in Example 1 was repeated except that the amount of divinyl benzene added to the starting monomer mixture was increased from 100 to 130 ppm by weight. The content of the divinyl benzene moiety in the resultant polymer was 123 ppm by weight.

Table 1 also shows the results of the measurements of several parameters obtained with this polymer.

EXAMPLE 4

The same experimental procedure as in Example 1 was repeated except that the amount of divinyl benzene added to the starting monomer mixture was increased from 100 to 170 ppm by weight. The content of the divinyl benzene moiety in the resultant polymer was 161 ppm by weight.

Table 1 also shows the results of the measurements of several parameters obtained with this polymer.

EXAMPLE 5

The experimental conditions were substantially the same as in Example 1 except that the amount of the polymerization initiator added to the starting monomer mixture was 40 ppm by weight instead of 80 ppm by weight, the monomer mixture was introduced into the first polymerization reactor at a rate of 7 liters per hour instead of 6 liters per hour and the temperature of the first polymerization reactor was 123° C. instead of 118° C. The content of the divinyl benzene moiety in the resultant polymer was 95 ppm by weight.

Table 1 also shows the results of the measurements of several parameters obtained with this polymer.

EXAMPLE 6

The same experimental procedure was repeated as in Example 5 except that 1,1-bis(tert-butylperoxy)-3,3,5-trimethyl cyclohexane as the polymerization initiator was replaced with the same amount of 2,2-bis(4,4-di-tert-butylperoxy cyclohexyl) propane. The content of the divinyl benzene moiety in the resultant polymer was 95 ppm by weight.

Table 1 also shows the results of the measurements of several parameters obtained with this polymer.

EXAMPLE 7

The same experimental procedure as in Example 1 was repeated except that divinyl benzene was replaced with the same amount of trimethylolpropane trimethacrylate. The content of the trimethylolpropane trimethacrylate moiety in the resultant polymer was 95 ppm by weight.

Table 1 also shows the results of the measurements of several parameters obtained with this polymer.

EXAMPLE 8

The experimental conditions were substantially the same as in Example 1 except that the starting monomer mixture further contained 5.0% by weight of ethyl benzene and 6.0% by weight of a polybutadiene rubber (Diene NF35A5, a product by Asahi Chemical Industry Co.) based on the styrene monomer, the temperature of the first polymerization reactor was 122° C. instead of 118° C. and the monomer mixture was introduced at a rate of 7 liters per hour instead of 6 liters per hour. The content of the divinyl benzene moiety in the polymer was 95 ppm by weight based on the amount of the styrene moiety.

Table 1 also shows the results of the measurements of several parameters obtained with this polymer.

The rubber particles dispersed in the thus prepared composite polymer had an average particle diameter of 2.1 μm.

COMPARATIVE EXAMPLE 1

The same experimental procedure as in Example 1 was repeated excepting omission of the divinyl benzene in the starting monomer mixture.

Table 1 also shows the results of the measurements of several parameters obtained with the thus prepared polymer.

COMPARATIVE EXAMPLE 2

The same experimental procedure as in Example 1 was repeated except that the amount of divinyl benzene added to the starting monomer mixture was increased from 100 to 400 ppm by weight. The content of the divinyl benzene moiety in the thus obtained polymer was 379 ppm by weight. This polymer was insoluble and infusible so that the physical parameters could not be determined.

COMPARATIVE EXAMPLE 3

The same experimental procedure as in Example 1 was repeated except that the polymerization initiator in the starting monomer mixture was omitted and the temperature of the first polymerization reactor was 131° C. instead of 18° C. The content of the divinyl benzene moiety in the thus obtained polymer was 95 ppm by weight.

Table 1 also shows the results of the measurements of several parameters obtained with this polymer.

COMPARATIVE EXAMPLE 4

The experimental conditions were substantially the same as in Example 1 except that the amount of the polymerization initiator added to the starting monomer mixture was increased from 80 ppm by weight to 600 ppm by weight, the monomer mixture was introduced into the first polymerization reactor at a rate of 10 liters per hour instead of 6 liters per hour and the temperature of the first polymerization reactor was 111° C. instead of 118° C. The content of the divinyl benzene moiety in the resultant polymer was 95 ppm by weight.

Table 1 also shows the results of the measurements of several parameters obtained with this polymer.

COMPARATIVE EXAMPLE 5

The same experimental procedure as in Example 1 was repeated except that the divinyl benzene and the polymerization initiator in the starting monomer mixture were both omitted and the temperature of the first polymerization reactor was 131° C. instead of 118° C.

Table 1 also shows the results of the measurements of several parameters obtained with the thus prepared polymer.

COMPARATIVE EXAMPLE 6

The same experimental procedure as in Example 1 was repeated except that the divinyl benzene in the monomer mixture was omitted, the amount of the polymerization initiator added to the monomer mixture was decreased from 80 to 40 ppm by weight and the temperature of the first polymerization reactor was 120° C. instead of 118° C.

Table 1 also shows the results of the measurements of several parameters obtained with the thus prepared polymer.

COMPARATIVE EXAMPLE 7

The same experimental procedure as in Example 8 was repeated except that the divinyl benzene in the monomer mixture was omitted and the temperature of the first polymerization reactor was 125° C. instead of 122° C.

Table 1 also shows the results of the measurements of several parameters obtained with the thus prepared polymer.

The rubber particles dispersed in the thus prepared composite polymer had an average particle diameter of 2.2 μm.

TABLE 1

| | Weight-average molecular weight $M_w$, × $10^4$ | Ratio of kinematic viscosities | MI, g/10 minutes | Thermal deformation temperature, °C. | Impact strength, kg·cm/cm$^2$ | High-speed moldability, number of shots |
|---|---|---|---|---|---|---|
| Example | | | | | | |
| 1 | 23 | 0.05 | 6.7 | 90 | 13.7[1] | ≧20 |
| 2 | 17 | 0.06 | 18.5 | 90 | 11.3[1] | ≧20 |
| 3 | 28 | 0.04 | 3.1 | 91 | 14.6[1] | 15 |
| 4 | 33 | 0.03 | 2.1 | 91 | 15.2[1] | 10 |
| 5 | 20 | 0.05 | 14.0 | 90 | 12.1[1] | ≧20 |
| 6 | 25 | 0.04 | 5.2 | 91 | 13.4[1] | 17 |
| 7 | 23 | 0.06 | 8.3 | 90 | 12.5[1] | ≧20 |
| 8 | 21 | 0.05 | 2.7 | 88 | 12.7[2] | ≧20 |
| Comparative Example | | | | | | |
| 1 | 17 | 0.10 | 18.7 | 88 | 9.2[1] | 1 |
| 3 | 22 | 0.08 | 7.1 | 88 | 9.6[1] | 1 |
| 4 | 13 | 0.11 | 24.0 | 87 | 7.5[1] | 1 |
| 5 | 40 | 0.09 | 1.4 | 88 | 10.5[1] | 1 |
| 6 | 23 | 0.06 | 5.8 | 88 | 9.9[1] | 5 |
| 7 | 21 | 0.09 | 2.4 | 87 | 8.6[2] | 5 |

[1]Flatwise impact strength
[2]Izod impact strength

REFERENCE EXAMPLE

The FIGURE of the accompanying drawing is a graphic showing of the steady-state compliance Je° of styrene-based polymers as a function of the weight-average molecular weight $M_w$ in which the curve plotted with filled circles is for the inventive styrene-based polymer prepared by using styrene as the aromatic monovinyl compound and divinyl benzene as the polyfunctional vinyl compound and the curve plotted with open circles is for a conventional general-purpose polystyrene available on the market.

This FIGURE clearly indicates that the steady-state compliance of the inventive styrene-based polymer depends on the weight-average molecular weight to give an evidence that the polymer has a branched molecular structure.

The measurement of the steady-state compliance here was performed by using a cone-and-disc type rheometer (Model RMS-800, manufactured by Rheometric Co.) of which the cone angle was 0.1 radian, at a temperature of 230° C., strain of 10% and shear rate $\omega = 600$ to $1 \times 10^{-2}$ rad/second according to the method for the determination of the ratio of kinematic viscosities.

What is claimed is:

1. A styrene based polymer which is a copolymer of an aromatic monovinyl compound and a polyfunctional vinyl compound, in which the weight proportion of the moiety derived from the polyfunctional vinyl compound is in the range from 30 to 300 ppm based on the moiety derived from the aromatic monovinyl compound, having a weight-average molecular weight in the range from 150,000 to 350,000, of which the ratio of kinematic viscosities $\Delta\eta'(\eta'_a/\eta'_b)$ does not exceed 0.07 where $\eta'_a$ and $\eta'_b$ are the kinematic viscosities when the shear rate in a cone-and-disc type rheometer is $1 \times 10^2$ rad/second and $1 \times 10^{-2}$ rad/second, respectively.

2. The styrene-based polymer as claimed in claim 1 wherein the aromatic monovinyl compound is styrene.

3. The styrene-based polymer as claimed in claim 1 wherein the polyfunctional vinyl compound is divinyl benzene or trimethylolpropane trimethacrylate.

4. The styrene-based polymer as claimed in claim 1 wherein the weight-average molecular weight is in the range from 180,000 to 330,000.

* * * * *